United States Patent
Gaeta et al.

(10) Patent No.: US 7,227,314 B1
(45) Date of Patent: Jun. 5, 2007

(54) VOLTAGE EQUALIZATION METHOD AND APPARATUS FOR LOW-VOLTAGE LIGHTING SYSTEMS

(76) Inventors: Celestino John Gaeta, 6401 Ebb Tide St., Carlsbad, CA (US) 92009; Curtiss Lynn Mixon, 1664 Olmeda St., Encinitas, CA (US) 92024; Larry Shintaku, 4161 Hanford St., Union City, CA (US) 94587

( * ) Notice: Subject to any disclaimer, the term of this patent is extended or adjusted under 35 U.S.C. 154(b) by 0 days.

(21) Appl. No.: 10/988,109

(22) Filed: Nov. 13, 2004

(51) Int. Cl.
*H05B 37/00* (2006.01)
(52) U.S. Cl. .................................. 315/185 R; 315/122
(58) Field of Classification Search ............ 315/185 S, 315/185 R, 200 A, 200 R, 92, 122, 129, 315/130, 312, 316, 318, 320, 324, 186–193, 315/224, 225, 307, 294, 178; 361/54, 56
See application file for complete search history.

(56) References Cited

U.S. PATENT DOCUMENTS

| | | | | |
|---|---|---|---|---|
| 3,973,168 A | * | 8/1976 | Kearsley | 315/232 |
| 4,745,342 A | * | 5/1988 | Andresen et al. | 315/200 R |
| 4,912,372 A | * | 3/1990 | Mongoven et al. | 315/122 |
| 5,008,595 A | * | 4/1991 | Kazar | 315/178 |
| 5,128,595 A | | 7/1992 | Hara | 315/312 |
| 5,150,016 A | * | 9/1992 | Sawase et al. | 315/294 |
| 5,283,516 A | | 2/1994 | Lohoff | 323/322 |
| 5,430,356 A | | 7/1995 | Ference et al. | 315/291 |
| 5,477,111 A | | 12/1995 | Steely et al. | 315/194 |
| 5,477,113 A | | 12/1995 | Christoffersson | 315/378 |
| 5,886,423 A | | 3/1999 | Gershen et al. | 307/36 |
| 6,084,357 A | * | 7/2000 | Janning | 315/122 |
| 6,323,597 B1 | | 11/2001 | Janning | 315/185.5 |

OTHER PUBLICATIONS

Jacob Millman, Ph.D. and Herbert Taub, Ph.D., Pulse, Digital, and Switching Waveforms, McGraw-Hill Book Company, New York, 1965, p. 241.

* cited by examiner

*Primary Examiner*—Wilson Lee (57) ABSTRACT

A method and apparatus to equalize the voltage across each light bulb in a low-voltage lighting system, commonly found in the yards of private homes and businesses. The present invention consists of a power compensation element that is inserted in-line with each light bulb connected to the bus lines that distribute current from a power source, such as an electrical transformer, to the light bulbs. The function of the power compensation element is to compensate for the voltage drop along the bus lines due primarily to the electrical resistance of the bus lines. Therefore, a compensation rating of the power compensation element may depend upon its location along the bus lines and the electrical resistivity of the bus lines, as well as the internal electrical resistance of the light bulbs. The preferred embodiment is an electrical resistive power compensation element where the rating of the element is its resistance value. One alternate embodiment is an electrical transformer power compensation element where the rating is the transformer ratio of output-to-input voltage, while another alternate embodiment is a diode-based, voltage-limiting circuit power compensation element, typically with equal rating where the rating is the voltage-limiting reference level of the circuit.

11 Claims, 10 Drawing Sheets

X is (optional) sequence label

X is (optional) sequence label

X is (optional) sequence label

FIG. 10

VOLTAGE EQUALIZATION METHOD AND APPARATUS FOR LOW-VOLTAGE LIGHTING SYSTEMS

CROSS-REFERENCE TO RELATED APPLICATIONS

None

FEDERALLY SPONSORED RESEARCH

Not Applicable

SEQUENCE LISTING OR PROGRAM

Note Applicable

BACKGROUND OF THE INVENTION

1. Field of the Invention

The present invention relates generally to low voltage lighting systems, and more specifically to systems which have long bus lines to deliver current to low voltage light bulbs located along the length of the bus lines.

2. Prior Art

At present, low-voltage lighting systems distribute current from a common power source to each light bulb in a parallel configuration. In other words, a wire (bus line) from the power source is connected to one end of several light bulbs along its length to distribute current in parallel to each light bulb. The product of the current and internal resistance of each light bulb is equal to the voltage drop across the light bulb; according to Ohm's law. Note that devices, concepts, and physical laws, such as Ohm's law, used in the theory of operation presented here are found in engineering texts such as William H. Hayt, Jr. and Jack E. Kemmerly, *Engineering Circuit Analysis*, Second Edition, McGraw-Hill Book Company, New York, 1971, and Jacob Millman, Ph.D. and Herbert Taub, Ph.D., *Pulse, Digital, and Switching Waveforms*, McGraw-Hill Book Company, New York, 1965. Another wire (return bus line) collects current from each light bulb and returns it back to the power source. If the resistance of the bus wire is zero, then no voltage drop occurs along the bus line and each light bulb has the same voltage applied across the bulb terminals, and thus the same electrical power or, alternatively, bulb brightness. However, in practice the bus wires have a finite (non-zero) internal resistance and thus experience a voltage drop along the length of the bus wires. This voltage drop means that the voltage applied across a light bulb will decrease with increasing distance from the power source. Thus light bulbs will be dimmer with increasing distance from the power source.

The voltage drop along the bus wires also limits the distance that light bulbs may be placed from the power source. However, the lighting effect is still one of light bulbs becoming dimmer with distance from the power source. The light bulbs are typically rated by maximum voltage applied across them and maximum electrical power. Dividing the square of the applied voltage by the power yields the internal electrical impedance of the light bulb. The impedance is a generalized electrical resistance that is well known to those skilled in the art, and includes the effects of electrical inductance and capacitance. In the case of a light bulb, a pure resistance may be assumed and will be used in the illustrative examples discussed here. In order to maintain voltage applied to each light bulb within its ratings, the power source is typically set to output a voltage near the limit (12 volts in a typical system). In this setting the light bulb closest to the power source may be driven with an applied voltage that is close to the source voltage in magnitude. However, the applied voltage may drop by several volts for a light bulb at the end of the bus line.

One possible method of compensation for an alternating current low-voltage system would be to introduce a transformer with an adjustable center tap in series with each light bulb and adjust the center tap to achieve the desired voltage across the light bulb. However, each time one transformer is adjusted it would influence the total current in the bus line and thus affect the voltage drop along the bus line. Therefore, this conventional approach would have to be iterative where each transformer is adjusted in turn and then the process repeated as needed until the voltages across each light bulb converges to the target voltage.

Another possible solution is a voltage regulator. However, voltage regulators in the form of integrated circuits apply to direct-current electrical systems, while low-voltage lighting systems typically are implemented using alternating current. Equivalents for more common alternating-current electrical circuits exist as servo-controlled transformers, but these are typically in large, relatively expensive chassis that are not practical for use at every bulb location in low-voltage lighting systems.

Sawase, et al. in "LED light source with an easily adjustable luminous energy," (U.S. Pat. No. 5,150,016) teach a system that utilizes a finite number of resistors connected to each other electrically in parallel, and a plurality of fuses connected electrically in series with the respective resistors, with the parallel combination of these resistors with fuses connected electrically in series with each LED light source. The idea here is that any current larger than the current rating of a fuse burns out that fuse and electrically disconnects the associated resistor. Therefore, at each LED location, any remaining resistors act to limit the current to the LED from a voltage source. This approach is not very efficient in the sense that many components (fuses and resistors) are employed that end up essentially being discarded from use in each device as the result of burning out fuses. The technique of Sawase, et al. allows only for a relatively coarse adjustment of the current through each individual means for illumination (LED) due to the finite number of resistors that may be practically connected to each LED. Furthermore, in Sawase, et al., the current-limiting method employed is applied on an individual basis for each individual means for illumination. However, the issues that result in a need for adjustment of illumination of each individual means for illumination generally result from system-wide effects.

OBJECTS AND ADVANTAGES

The present invention allows the same voltage to be applied across each light bulb regardless of its location along the bus lines in a low-voltage light system. Therefore, all similar bulbs will have similar brightness. Following are some of the features of the proposed novel system:

(a) All light bulbs may be operated at the same (including maximum) brightness.
(b) Proposed invention may be implemented as an add-on component to existing low-voltage lighting systems, either inserted within each light fixture in series with the light bulb or inserted in the cable connecting the light fixture to the bus lines.

(c) Proposed invention may be integrated into next-generation low-voltage light fixtures, or cabling.

(d) Proposed invention does not require trial and error adjustment.

SUMMARY OF THE INVENTION

We present a method and apparatus for equalizing the voltage across each light bulb in a low-voltage lighting system. For the situation where all light bulbs in a given low-voltage lighting system have similar power and voltage ratings (more specifically, internal resistance), equalizing the voltage also equalizes the power. Such systems are commonly found in yards of private homes and some businesses. The light bulbs in such systems are driven in parallel from a common power source, such as a transformer connected to a standard alternating-current electrical outlet in a home. A typical case is one in which the transformer transforms an input voltage of 120 volts to 12 volts, which is ideally presented at the input of all light bulbs connected via an input bus line in parallel to the transformer. A return bus line connects the other terminal of all light bulbs to the return terminal of the transformer. If the bus line distributing current from the transformer has zero internal resistivity (resistance per unit length of bus line), then there is no voltage drop along the bus line and the ideal case is achieved. However, in practice there is always a finite resistivity in the bus lines, which results in a voltage drop along the bus line when current is flowing.

The present invention is a power compensation element located electrically in series or parallel with each light bulb, along with the method of determining the required rating of the element. The preferred embodiment is an electrical resistive element in series with each light bulb where the rating is the value of the resistance. Adjustment of the resistance value is intended as either a discretely or continuously adjustable resistor, or several elements with different values of resistance that could optionally be stacked in series or parallel. This value may be calculated by referring to tabulated values computed from formulas associated with the invention, or directly from the formulas. In two possible implementations, the resistive element may be inserted inside low-voltage light fixtures in series with the light bulb, or in series with cables connecting the light fixture to the bus line. In the latter case, the resistance would have to be rendered water-proof prior to installation. In next-generation low-voltage lighting systems, the resistive element could be integrated into the light fixture itself.

One alternate embodiment is an electrical transformer where the rating is the multiplicative transformer factor (expressed in terms of transforming voltage, current, or resistance between input and output terminals of the transformer). Another alternate embodiment is an electrical diode-based, voltage-limiting-circuit power compensation element, typically with the same rating for all light bulbs in a given light system. The latter alternate embodiment contains internal voltage reference levels (serving as the rating) to automatically limit the power for each light bulb. With a sufficiently high voltage level at the power source, all light bulbs would then be substantially equal in brightness.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
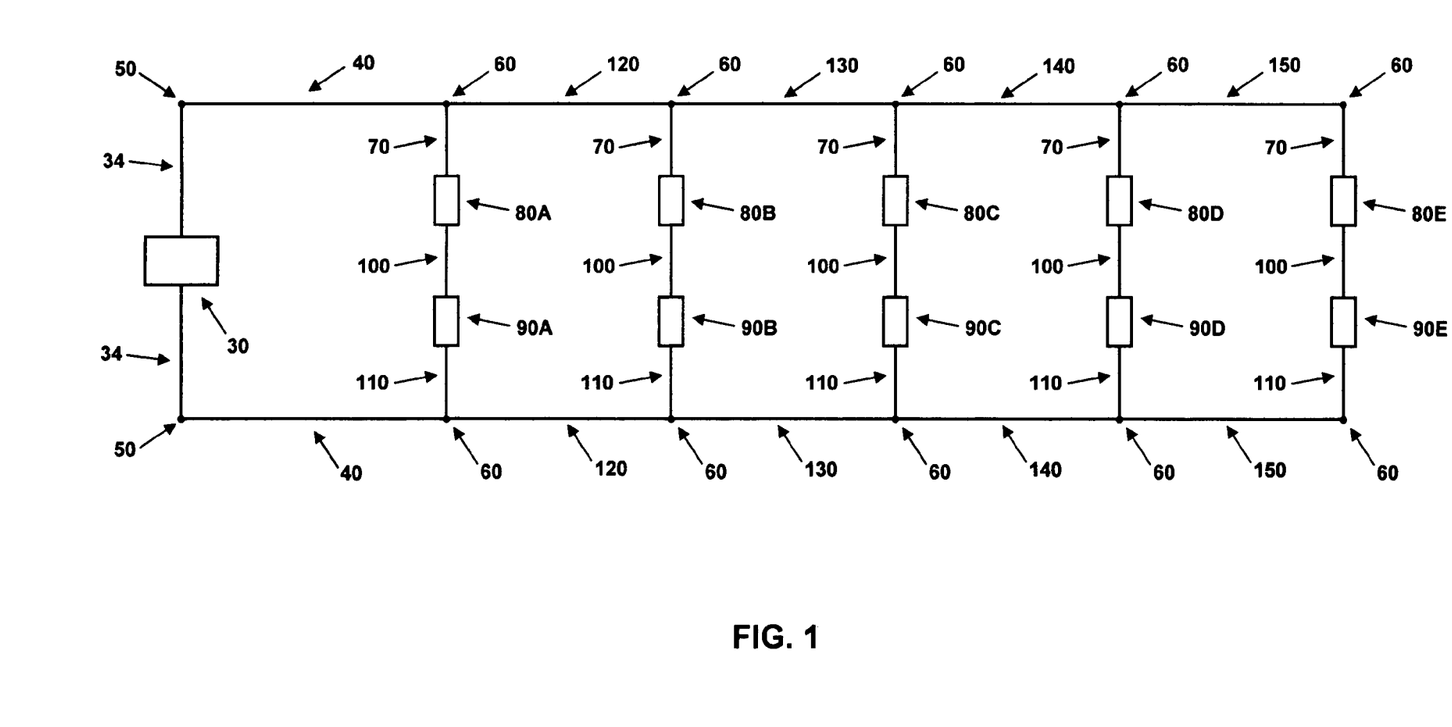
FIG. 1 is an electrical diagram of an example low voltage-light system with 5 light bulbs incorporating resistive power compensation elements.

A low-voltage lighting system with five light bulbs of the same power and voltage ratings (internal resistance) will be used as a representative example in order to facilitate the explanation of the current invention without loss of generality. The results will then be generalized to an arbitrary number N of light bulbs, electrically connected in parallel with the power source. In the preferred embodiment, the current invention is comprised of an adjustable resistance placed electrically in series with each light bulb, as well as the method of determining the required value of the resistance for equalizing the power in each light bulb. FIG. 1 depicts a block diagram of the electrical description for the example low-voltage lighting system.

System Description

An electrical power source 30 with electrical connectors 34 is attached to electrical conductors 40 via connection nodes 50. One of the conductors 40 is connected, via a connection node 60, to an electrical connector 70. The electrical connector 70 is also connected to one terminal of a light bulb 80A. Other light bulbs depicted in the example system of FIG. 1 are designated 80B, 80C, 80D, and 80E. The other terminal of the light bulb 80A is electrically connected to one terminal of a resistive compensation element 90A (note that the other light bulbs are in series with their respective resistive compensation elements labeled 90B, 90C, 90D, and 90E) via an electrical connector 100. Another electrical connector 110 connects the other terminal of the resistive compensation element 90A to the other conductor 40 at a connection node 60.

Conductors 120, 130, 140, and 150 extend the electrical circuit to connect the power source 30 with the other light bulbs and resistive compensation elements, as shown in FIG. 1.

The arrangement of electrical connectors and conductors, linking the light bulb 80A and the resistive compensation element 90A to each other and to the power source 30, allow current to flow between the power source 30, the light bulb 80A, and the resistive element 90A. Current flowing into the connection node 50 from an electrical connector 34 is equal to the current flowing from the connection node 50 into the adjacent conductor 40. In an alternating current system, the direction of current flow is periodically reversed so that half of the time the relationship of the current flow at connection node 50 is as described previously. The other half of the time, current flowing into the connection node 50 from conductor 40 is equal to the current flowing from the connection node 50 into the adjacent electrical connector 34.

Current flowing through a conductor 40 is also split (typically not in equal amounts) between a branch containing the series combination of the light bulb 80A and resistive compensation element 90A, and the adjacent conductor 120 via a connection node 60. Similarly, current flowing through a conductor 120 is also split (typically not in equal amounts) between a branch containing the series combination of the light bulb 80B and resistive compensation element 90B, and the adjacent conductor 130 via a connection node 60. Likewise, current flowing through a conductor 130 is also split (typically not in equal amounts) between a branch containing the series combination of the light bulb 80C and resistive compensation element 90C, and the adjacent conductor 140 via a connection node 60. Finally (in this example for five light bulbs), current flowing through a conductor 140 is also split (typically not in equal amounts) between a branch containing the series combination of the light bulb 80D and resistive compensation element 90D, and the adjacent conductor 150 via a connection node 60. Current flowing in a conductor 150 is also equal in magnitude to current flowing in the branch containing the series combination of the light bulb 80E and the resistive compensation element 90E.

We note that present low-voltage light systems do not have a power compensation element so that the basic system description presented above would apply with the resistive compensation element replaced by an electrical conductor of zero internal resistance.

Theory of Operation

The power source 30 has an output voltage $V_S$ between its two electrical connectors 34, which results in a total current $I_S$ in conductors 40 when the system is in operation. The electrical conductors 40 each have a length $L_1$ and a resistivity (electrical resistance per unit length) $\rho_1$, yielding a total resistance given by the product $\rho_1 L_1$ in each conductor. Conductors 120, 130, 140, and 150 each have total resistances (length and resistivity products) given by $\rho_2 L_2$, $\rho_3 L_3$, $\rho_4 L_4$, and $\rho_5 L_5$, respectively. In typical low-voltage light systems, the lengths of the electrical connectors 34, 70, 100, and 110 are much less than the length of conductors 40, 120, 130, 140, and 150, so that their internal resistance may be neglected in comparison to the latter set of conductors.

In this electrical analysis the light bulbs are represented by their internal resistance values, given by $R_B$. The resistance values for the resistive compensation elements 90A, 90B, 90C, 90D, and 90E are represented by $R_1$, $R_2$, $R_3$, $R_4$, and $R_5$, respectively. Consider the following relationships from electrical circuit analysis:

$$V = I R \quad (1)$$

$$P = I^2 R. \quad (2)$$

Equation (1) states that the voltage-drop V across a resistor with resistance value R is equal to the product of the current I flowing through the resistor and R. The power P dissipated in the resistor is given by the product of the square of the current I and the resistance value R, expressed mathematically in Equation (2).

Other required electric circuit relationships are the rules for combining resistors connected in series or in parallel with each other. In a series combination, where the same actual current flows through the connected resistors, an equivalent single resistor is equal to the sum of the individual resistor values. A parallel combination of resistors is one in which current entering a common connection point (node) on one side of the resistors is split into separate currents flowing in the parallel paths and then recombining again at the common connection point (node) on the other side of the resistors. In the parallel configuration, the sum of the individual currents flowing in each resistor connected in parallel is equal to the total current entering (or exiting) the parallel combination at the nodes but the voltage drop is the same across each parallel path. According to Equation (1), equal currents flow in each of the parallel paths for a parallel combination of resistors when all resistors connected in parallel have the same value of resistance. Adding the reciprocals of the individual resistance values gives the reciprocal of the total combined resistance value in a parallel arrangement.

The method of analysis begins by requiring equal electrical power for light bulbs 80D and 80E. Since the light bulbs in this example have the same internal resistance and power is given by the product of the resistance and the square of the current passing through it, the requirement dictates equal current flow through each of the two light bulbs. The branch of the circuit containing the series combination of light bulb 80D and resistive compensation element 90D is electrically in parallel with the circuit branch containing the series combination of light bulb 80E, resistive compensation element 90E, and conductors 150. Therefore, the total resistance of each branch must be equal to yield equal currents (in each branch):

$$R_4 + R_B = R_5 + 2\rho_5 L_5 + R_B. \quad (3)$$

The value of the resistive compensation element $R_5$ will be shown to be arbitrary and thus taken as a constant here. Subtracting $R_B$ from both sides of Equation (3) then yields the required value of $R_4$ in terms of the light bulb resistance $R_B$, resistive compensation element R5, and total resistance of the two conductors 150 of FIG. 1:

$$R_4 = R_5 + 2\rho_5 L_5. \quad (4)$$

Circuit components 80D, 90D, 80E, 90E, and 150 may be represented by an equivalent resistance $R_{4T}$ using the rules for series and parallel combination of resistors, described previously:

$$(R_{4T})^{-1} = (R_4 + R_B)^{-1} + (R_5 + 2\rho_5 L_5 + R_B)^{-1}. \quad (5)$$

Equations (4) and (5) may be combined to eliminate the value $R_4$ and solved for $R_{4T}$, which yields $$R_{4T}=(R_5+2\rho_5L_5+R_B)/2. \tag{6}$$

Figure 2:
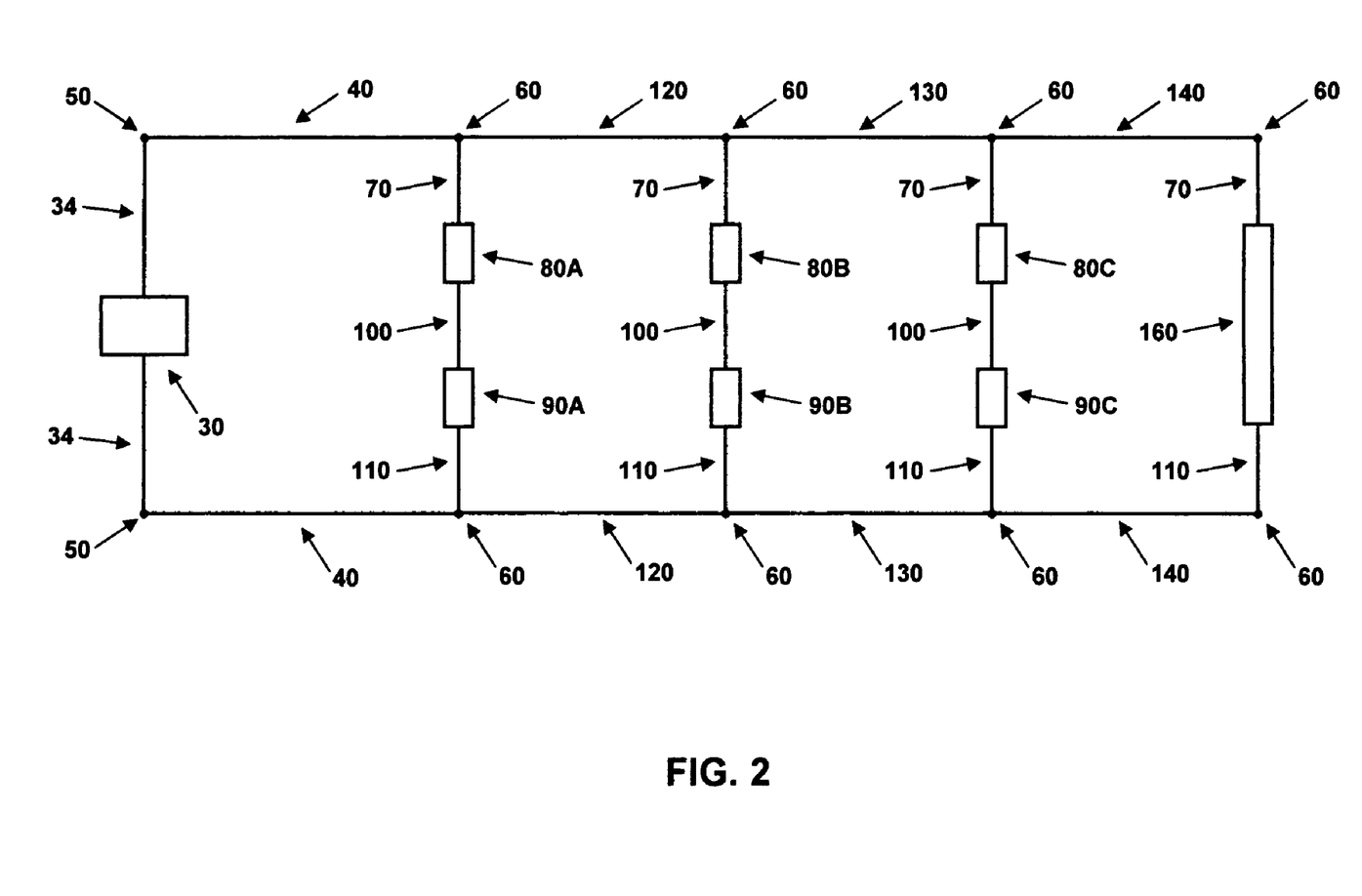
FIG. 2 is an electrical diagram of an example low voltage-light system with 5 light bulbs incorporating resistive power compensation elements, in which the fourth and fifth light bulb circuits are modeled by an equivalent resistance.

The resulting effective electric circuit representation is shown in FIG. 2, where the equivalent resistor 160 has a resistance value given by $R_{4T}$. Next require the same amount of current to flow in each of light bulbs 80C, 80D, and 80E in FIG. 1. This requirement means that twice as much current must flow through element 160 as through light bulb 80C in the equivalent circuit of FIG. 2. In order to obtain this distribution of current at the adjacent connection nodes 60, the series combination of light bulb 80C and resistive compensation element 90C must have twice the total resistance of the series combination of the resistor 160 and conductors 140:

$$R_3+R_B=2(R_{4T}+2\rho_4L_4) \tag{7}$$

Using Equation (6) in Equation (7) to eliminate $R_{4T}$ allows the value of the resistive compensation element 90C, represented by $R_3$, to be determined as $$R_3=R_5+2\rho_5L_5+4\rho_4L_4. \tag{8}$$

Following the same procedure that was used to obtain the equivalent resistance given by $R_{4T}$, light bulb 80C, resistive compensation element 90C, resistor 160, and conductors 140 (see FIG. 2) may be represented by an equivalent resistor of resistance $R_{3T}$ using $$(R_{3T})^{-1}=(R_3+R_B)^{-1}+(R_{4T}+2\rho_4L_4)^{-1}. \tag{9}$$

Combining Equations (6), (8), and (9) to eliminate $R_3$ gives an expression for $R_{3T}$ in terms of the resistive compensation element resistance $R_5$, light bulb resistance $R_B$, and resistance values for conductors 140 and 150 as $$R_{3T}=(R_5+2\rho_5L_5+4\rho_4L_4+R_B)/3. \tag{10}$$

Figure 3:
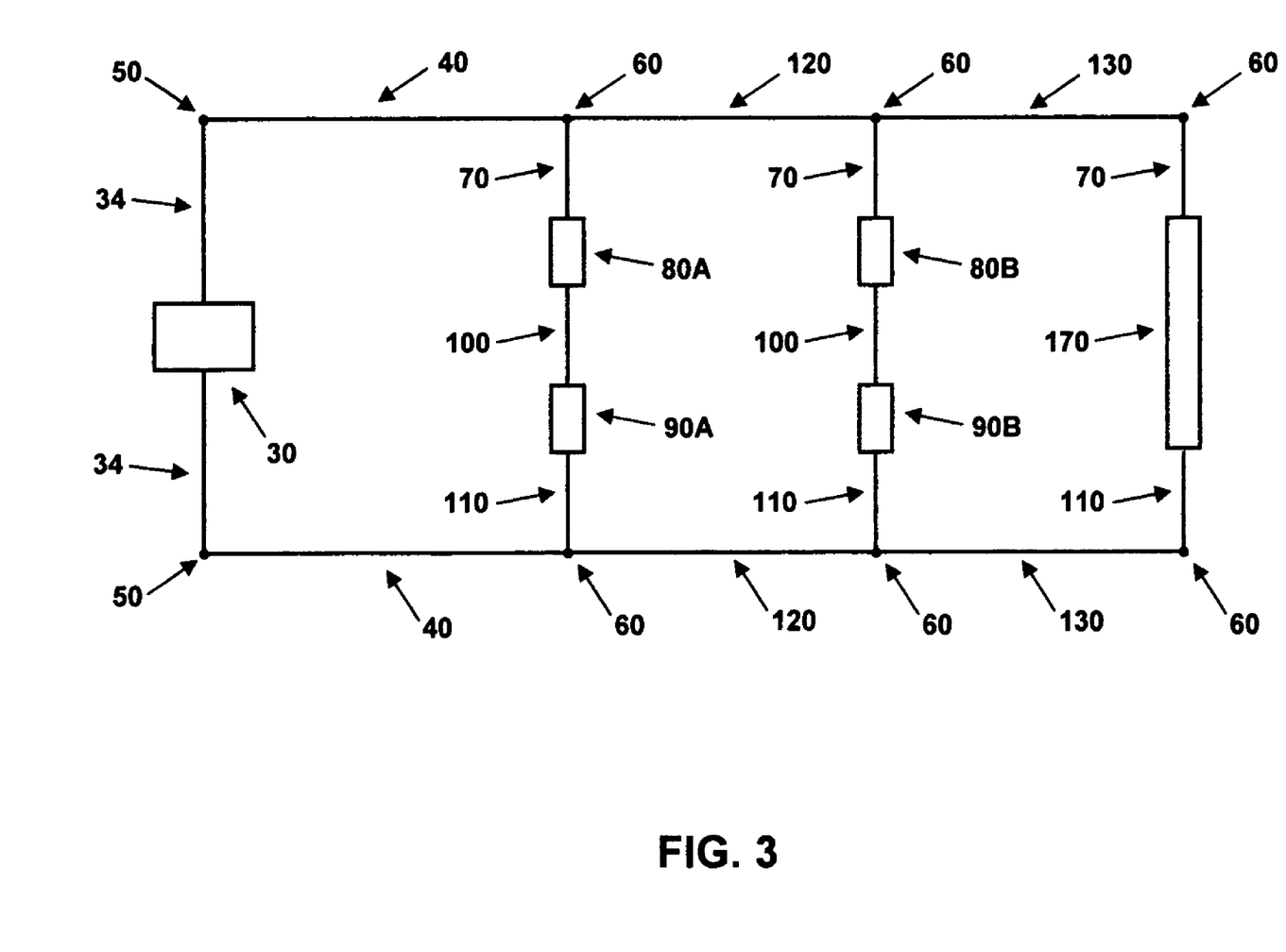
FIG. 3 is an electrical diagram of an example low voltage-light system with 5 light bulbs incorporating resistive power compensation elements, in which the third, fourth, and fifth light bulb circuits are modeled by an equivalent resistance.

FIG. 3 displays the equivalent circuit representation incorporating an equivalent resistor 170 with equivalent resistance value of $R_{3T}$, as derived above. Continuing with the analysis, it is required that the same amount of current flows in each of light bulbs 80B, 80C, 80D, and 80E in FIG. 1. This condition demands that the amount of current flowing through the equivalent resistor 170 in FIG. 3 must be three times the amount of current flowing through the light bulb 80B. Alternatively, in terms of resistance values the series combination of light bulb 80B and resistive compensation element 90B must have three times the total resistance of the series combination of the equivalent resistor 170 and conductors 130 in FIG. 3:

$$R_2+R_B=3(R_{3T}+2\rho_3L_3) \tag{11}$$

Substituting the right-hand-side of Equation (10) for $R_{3T}$ in Equation (11) yields a solution for $R_2$ in terms of $R_5$ and conductor resistances:

$$R_2=R_5+2\rho_5L_5+4\rho_4L_4+6\rho_3L_3. \tag{12}$$

Figure 4:
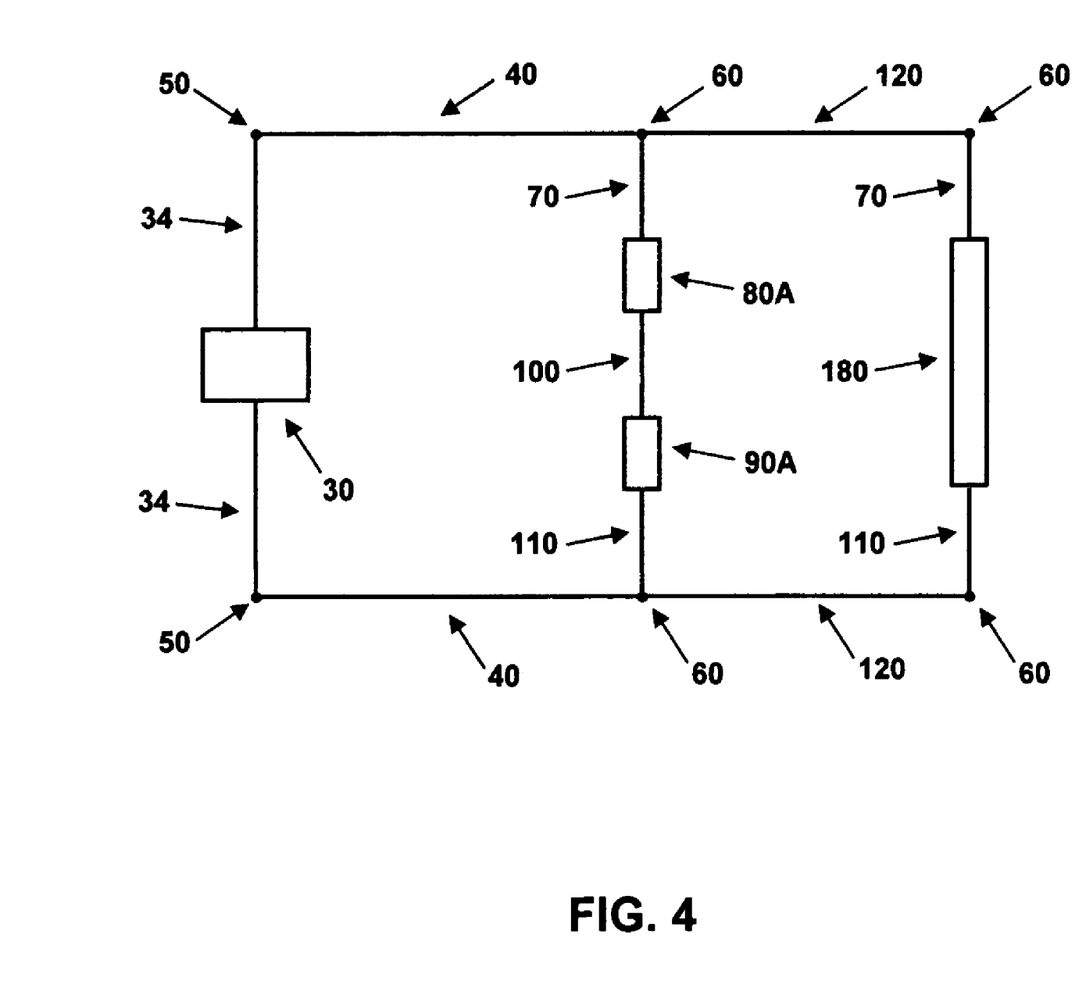
FIG. 4 is an electrical diagram of an example low voltage-light system with 5 light bulbs incorporating resistive power compensation elements, in which the second, third, fourth, and fifth light bulb circuits are modeled by an equivalent resistance.

The resistance $R_{2T}$ of an equivalent resistor 180, shown in FIG. 4, may be obtained as above from:

$$(R_{2T})^{-1}=(R_2+R_B)^{-1}+(R_{3T}+2\rho_3L_3)^{-1}, \tag{13}$$

and using Equations (10) and (12) in Equation (13) one obtains the expression:

$$R_{2T}=(R_5+2\rho_5L_5+4\rho_4L_4+6\rho_3L_3+R_B)/4. \tag{14}$$

Imposing the requirement of equal currents through all light bulbs means that the current through the resistor 180 of FIG. 4 must be four times the current through the light bulb 80A, or in terms of relative values of resistance:

$$R_1+R_B=4(R_{2T}+2\rho_2L_2). \tag{15}$$

Eliminating $R_{2T}$ between Equations (14) and (15) gives a more useful expression for the resistance $R_1$:

$$R_1=R_5+2\rho_5L_5+4\rho_4L_4+6\rho_3L_3+8\rho_2L_2. \tag{16}$$

At this point in the derivation for the five light bulb example, expressions have been derived for the values $R_1$, $R_2$, $R_3$, and $R_4$ of the resistive compensation elements 90A, 90B, 90C, and 90D, respectively. Equations (4), (8), (12), and (16) allow these values to be calculated from knowledge of conductor resistivity, conductor length, and an arbitrarily chosen value for the resistance $R_5$ of the resistive compensation element associated with the final light bulb 90E in the circuit. Conductor resistivity is readily available by referencing the American Wire Gage (AWG) designation for the conductors that may be found, for example, in the *American Institute of Physics Handbook*, Dwight E. Gray, Coordinating Editor, McGraw-Hill Book Company, New York, 1963, Section 5, pp. 158–159. The resistance $R_5$ is arbitrary since it may be viewed simply as a constant added to each of the other values of the resistive compensation elements regardless of conductor length and resistivity without violating the requirement of equal amount of current flowing through each light bulb. Typically, $R_5$ would be chosen to be zero (no resistive compensation element for the final light bulb in the circuit).

Figure 5:
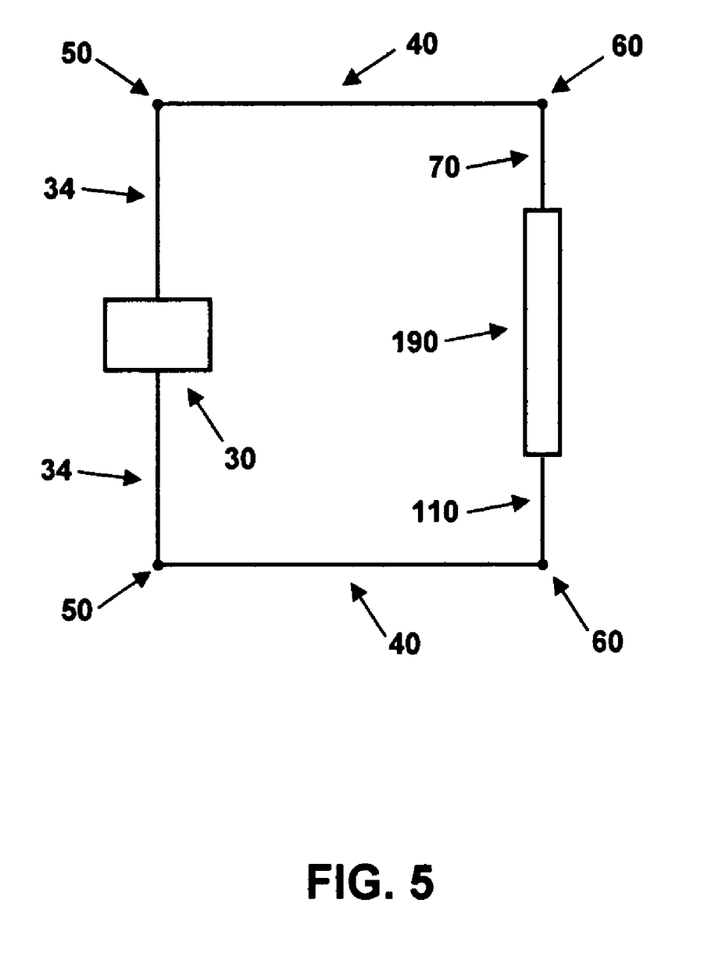
FIG. 5 is an electrical diagram of an example low voltage-light system with 5 light bulbs incorporating resistive power compensation elements, in which all five light bulb circuits are modeled by an equivalent resistance.

Finally, all of the light bulbs, resistive compensation elements, and intervening conductors may be represented by an equivalent resistor 190, as shown in FIG. 5, with resistance value $R_{1T}$ given by $$(R_{1T})^{-1}=(R_1+R_B)^{-1}+(R_{2T}+2\rho_2L_2)^{-1}, \tag{17}$$

or using Equations (14) and (16) in Equation (17), the expression for $R_{1T}$ becomes:

$$R_{1T}=(R_5+2\rho_5L_5+4\rho_4L_4+6\rho_3L_3+8\rho_2L_2+R_B)/5. \tag{18}$$

Even though the resistive compensation elements provide equal current flow through each light bulb, there is still a voltage drop across the conductors. Therefore, the supply voltage must be somewhat higher than the rated voltage of the light bulbs to achieve maximum rated power in each light bulb. In order to determine the value of the supply voltage $V_S$, it is convenient to first determine the value $I_B$ of the current flowing through each light bulb. Defining $P_B$ as the rated power of the light bulb, and using Equation (2) yields:

$$I_B=(P_B/R_B)^{1/2} \tag{19}$$

Applying Equation (1) to the equivalent circuit of FIG. 5 gives:

$$V_S=(5I_B)(R_{1T}+2\rho_1L_1), \tag{20}$$

where it should be noted that the value of the total supply current must be five times the value of the current flowing through each of the five light bulbs. A more useful expression for calculating the value $V_S$ may be obtained by combining Equations (18)–(20) to obtain:

$$V_S=(P_B/R_B)^{1/2}(R_5+2\rho_5L_5+4\rho_4L_4+6\rho_3L_3+8\rho_2L_2+10\rho_1L_1+R_B). \tag{21}$$

Light bulbs are normally rated in terms of power and voltage. These quantities can be used to calculate the resistance $R_B$. Solving for the current in Equation (1) and substituting the resulting expression in place of the current in Equation (2) for the light-bulb parameters yields $$R_B = (V_B)^2/P_B. \tag{22}$$

Equations (4), (8), (12), (16), (21), and (22) allow for the implementation of a power compensation method for a low-voltage light system with five light bulbs. This derivation also lays the foundation for the analysis of the general case with an arbitrary number of light bulbs.

Inspection of Equations (4), (8), (12), and (16) reveals a pattern which can be used by those skilled in the art to write the equations for the general case of N light bulbs $$R_i = R_N + 2\sum_{j=i+1}^{N}(N-j+1)\rho_j L_j \tag{23}$$

where the subscript i represents the $i^{th}$ light bulb starting with i=1 referring to the light bulb electrically nearest the power supply and ending with i=N for the light bulb in the circuit that is electrically furthest from the power supply. The symbol $\Sigma$ represents a summation of the terms following it starting with a value of the counter j given by j=i+1, incrementing j by 1 for each term in the sum, and ending with a final value of j=N.

Likewise, the pattern observed in Equation (21) allows those skilled in the art to write the value of the supply voltage for the general case as $$V_S = (P_B/R_B)^{1/2}\left[R_N + R_B + 2\sum_{j=1}^{N}(N-j+1)\rho_j L_j\right] \tag{24}$$

with the resistance of the final light bulb $R_N$ being arbitrary. Equations (23) and (24) involve the general case where the conductor segments may have different resistivity values and lengths. In this case, it is seen that a solution exists to equalize the current (and thus power) for each light bulb. However, in practice most low-voltage light systems use the same type of conductor to form the bus lines, although the spacing between light bulbs may vary slightly. Therefore, a simplified result may be obtained by selecting all resistivity values to be equal:

$$R_i = R_N + 2\rho\sum_{j=i+1}^{N}(N-j+1)L_j \tag{25}$$

$$V_S = (P_B/R_B)^{1/2}\left[R_N + R_B + 2\rho\sum_{j=1}^{N}(N-j+1)L_j\right]. \tag{26}$$

Setting N=5 in Equations (25) and (26) and expanding the summation for each value of the counter i from i=1 to i=5, leads to the same expressions for the resistance values of the resistive compensation elements given by Equations (4), (8), (12), and (16) and the value of the supply voltage given by Equation (21) when each resistivity value $\rho_1$, $\rho_2$, $\rho_3$, $\rho_4$, and $\rho_5$ is replaced by $\rho$.

$$R_4 = R_5 + 2\rho L_5 \tag{27}$$

$$R_3 = R_5 + 2\rho(L_5 + 2L_4) \tag{28}$$

$$R_2 = R_5 + 2\rho(L_5 + 2L_4 + 3L_3) \tag{29}$$

$$R_1 = R_5 + 2\rho(L_5 + 2L_4 + 3L_3 + 4L_2) \tag{30}$$

$$V_S = (P_B/R_B)^{1/2}[R_5 + R_B + 2\rho(L_5 + 2L_4 + 3L_3 + 4L_2 + 5L_1)]. \tag{31}$$

Consider a low-voltage light system with 5 light bulbs, each rated at 20 watts and 12 volts. The internal resistance of each light bulb is found to be $R_B$=7.2 ohms using Equation (22). The conductors are 12 AWG, solid wires with associated resistivity of $\rho$=0.00521 ohms/meter. Furthermore, assume that all of the bus-line conductors have equal lengths of 12 meters and take $R_5$=0. Equations (27)–(30) can then be used to calculate the required values of the resistive compensation elements that will cause an equal amount of current to flow through each of the five light bulbs. The values are $R_1$=1.250 ohms, $R_2$=0.750 ohms, $R_3$=0.375 ohms, and $R_4$=0.125 ohms. In order to supply the necessary total current required to maintain the rated 20 watt power level for each light bulb, the supply voltage must be increased from an ideal value of 12 volts to 15.1 volts, according to Equation (31). Note that the ideal level is only achievable for zero conductor losses, which does not exist in practice.

The current flowing through each light bulb (and also through each resistive compensation element) may be found using Equation (2) with the power and resistance values equal to 20 watts and 7.2 ohms, respectively. This calculation yields a light-bulb current value of 1.7 amps, with a total current of 5×1.7 amps=8.5 amps required from the power supply to drive all five light bulbs. The maximum power dissipated in a resistive compensation element is found by taking the largest resistance value, which is given by $R_1$=1.250 ohms, the current level of 1.7 amps, and using these values in Equation (2), which gives 3.6 watts. Knowledge of the dissipated power is necessary for selecting the power rating of the resistive compensation element.

In order to demonstrate the improvement that the present invention provides over the current state-of-the-art, it is useful to calculate the power from each light bulb in the five light-bulb system example assuming that no resistive compensation elements are included in the system. FIGS. 1–5 can still be used to represent the system, but with the values of the resistive compensation elements set to zero. In order to calculate the power levels, it is necessary to first derive the expressions for the equivalent resistance values. The notations and definitions for this case will be the same as before but with the superscript "c" added to indicate that the parameter pertains to the current state-of-the-art system. The procedure follows similar steps used above and leads to:

$$R^C_{4T} = R_B(R_B + 2\rho_5 L_5)/[2(R_B + \rho_5 L_5)] \tag{32}$$

$$R^C_{3T} = R_B(R^C_{4T} + 2\rho_4 L_4)/(R_B + R^C_{4T} + 2\rho_4 L_4) \tag{33}$$

$$R^C_{2T} = R_B(R^C_{3T} + 2\rho_3 L_3)/(R_B + R^C_{3T} + 2\rho_3 L_3) \tag{33}$$

$$R^C_{1T} = R_B(R^C_{2T} + 2\rho_2 L_2)/(R_B + R^C_{2T} + 2\rho_2 L_2) \tag{34}$$

Using the same values as before for the light bulb resistance, conductor resistivity, and conductor lengths gives $R^C_{1T}$=1.59 ohms, $R^C_{2T}$=1.91 ohms, $R^C_{3T}$=2.47 ohms, and $R^C_{4T}$=3.63 ohms. The value of the supply current, which is the current $I^C{}_{40}$ flowing in each of the conductors 40 in FIG. 5, may be calculated using the following form of Equation (1)

$$I^C{}_{40}=V^C{}_S/(R^C{}_{1T}+2\rho_1 L_1), \tag{35}$$

where the supply voltage is $V^C{}_S=12$ volts. The current is calculated to be $I^C{}_{40}=6.98$ amps, which gives a voltage of (6.98 amps)×(1.59 ohms)=11.10 volts across the equivalent resistor 190 of FIG. 5 with resistance now given by $R^C{}_{1T}=1.59$ ohms. Since the equivalent resistor 190 of the circuit presented in FIG. 5 is substituted in parallel for the light bulb 80A of the circuit shown in FIG. 4 (recall that the resistive compensation element 90A has zero resistance here), the value of the voltage across the light bulb is also equal to 11.10 volts. Therefore, the current in the first light bulb is $I^C{}_1=(11.10 \text{ volts}/7.2 \text{ ohms})=1.54$ amps and the light bulb power is $P^C{}_1=(1.54 \text{ amps})^2 \times (7.2 \text{ ohms})=17.1$ watts. Note that the power level in the first light bulb (closest to the power supply) is already 2.9 watts lower than the rated level of 20 watts using the current state-of-the-art technology.

The portion of the supply current that is not diverted to the first light bulb flows in each of the conductors 120, and is given by $I^C{}_{120}=I^C{}_{40}-I^C{}_1=6.98$ amps−1.54 amps=5.44 amps. This current gives rise to a voltage across the equivalent resistor 180 of the circuit shown in FIG. 4, with resistance value $R^C{}_{2T}=1.91$ ohms, of magnitude (5.44 amps)×(1.91 ohms)=10.39 volts. Using the same reasoning as in the case of the first light bulb, the voltage across the second light bulb 80B of FIG. 3 is also 10.39 volts. Continuing in the same manner used for the first light bulb, the current and power levels for the second light bulb are calculated to be $I^C{}_2=(10.39 \text{ volts}/7.2 \text{ ohms})=1.44$ amps and $P^C{}_2=(1.44 \text{ amps})^2 \times (7.2 \text{ ohms})=14.9$ watts, respectively. Applying the method to the remaining light bulbs leads to $P^C{}_3=13.5$ watts, $P^C{}_4=12.7$ watts, and $P^C{}_5=12.2$ watts.

Of course, one could increase the supply voltage above 12 volts in the example just presented as long as the voltage across the first light bulb does not exceed the 12 volt rating. In order to achieve the rated 20 watts in the first light bulb, the current flowing through it must be equal to approximately 1.67 amps, using Equation (2), and an associated voltage across the light bulb of magnitude 12 volts (the maximum rating) from Equation (1). Since this voltage is the same as the voltage across the equivalent resistor 190 of FIG. 5, the current in each of the conductors 40 is found to be 12 volts/1.59 ohms=7.55 amps. This current yields a voltage of (7.55 amps)×(0.00521 ohms/meter)×(12 meters)=0.47 volts across each of the conductors 40 of FIG. 5. Therefore, the supply voltage would have to be increased from 12 volts to 12.47 volts. The power levels in the rest of the light bulbs are calculated as above and found to be approximately $P^C{}_2=16.1$ watts, $P^C{}_3=14.6$ watts, $P^C{}_4=13.7$ watts, and $P^C{}_5=3.2$ watts. It is clear that even increasing the supply voltage to the maximum allowable value still results in light-bulb power levels decreasing by several watts along the circuit.

It should be noted that Equations (4), (7), (11), and (15) show that the equalization of the voltage across each light bulb requires the resistance value of a given compensation element be chosen such that the sum of the resistance value and the value of the internal resistance of the associated light bulb be proportional to the total electrical resistance beyond the location of the compensation element to the location of the most distance fixture from the power source. The numerical multipliers of the total electrical resistance in Equations (4), (7), (11), and (15) are actually dependent upon the internal resistance of light bulbs located beyond the compensation element being determined in those equations. Specifically, the sum of the reciprocals of the internal resistance values of those light bulbs divided by the reciprocal of the internal resistance of the light bulb associated with the compensation element determines the required current distribution. When all the internal resistance values of the light bulbs involved are the same in a given calculation, the result is an integer multiplier.

Alternate Embodiment Using Transformer Compensation Elements

Figure 6:
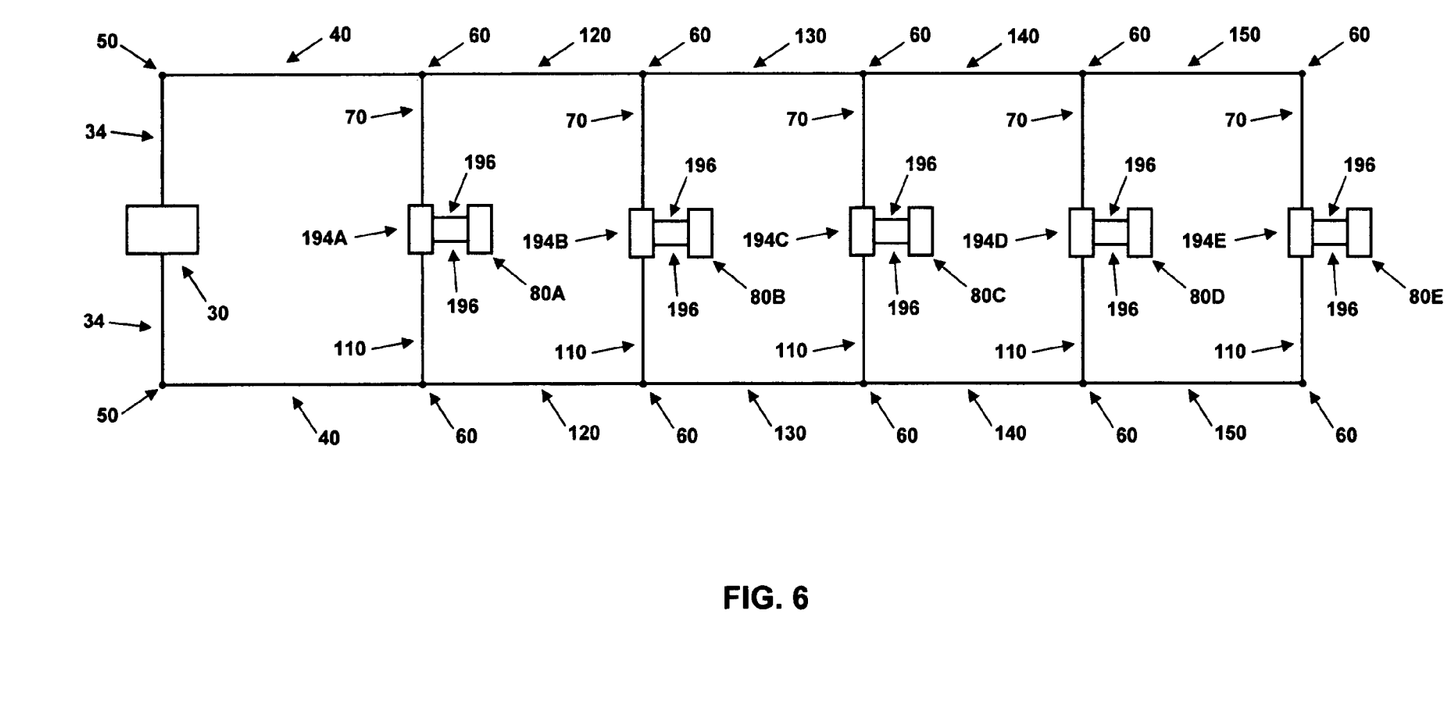
FIG. 6 is an electrical diagram of an example low voltage-light system with 5 light bulbs incorporating transformer power compensation elements.

An alternate embodiment of the present invention involves using electrical transformers instead of resistive compensation elements. This method may only be used in lighting systems using alternating current. FIG. 6 shows an electrical representation of a power equalization apparatus using transformer compensation elements for a low voltage light system with five light bulbs. In contrast to the method employing resistive compensation elements depicted in FIG. 1, the electrical connectors 70 and 110 are now connected to the input terminals of electrical transformers 194A, 194B, 194C, 194D, and 194E. The output terminals of transformers 194A, 194B, 194C, 194D, and 194E are connected to the light bulbs 80A, 80B, 80C, 80D, and 80E, respectively, via electrical connectors 196. The electrical connectors 196 are taken to have negligible internal resistance that is assumed to be zero here.

An electrical transformer converts the magnitude of a voltage applied across a set of input terminals to another magnitude across its output terminals by a multiplicative factor that is a characteristic of the transformer. The input current is related to the output current by the reciprocal of this factor so that the power flow into the input terminals is equal to the power flow from the output terminals. Let the multiplicative factors of the transformers 194A, 194B, 194C, 194D, and 194E be represented by $T_1$, $T_2$, $T_3$, $T_4$, and $T_5$, respectively. The method for obtaining equal power from each light bulb using the transformer compensation scheme involves determining the multiplicative factor of each transformer based upon its location in the circuit.

First, assume equal power from each light bulb. Alternatively, for similar light bulbs the current flowing through each light bulb must have the same value $I_B$. Referring to FIG. 6, the current flowing through the conductors 150 has a magnitude given by the product $T_5 I_B$. Next, note that the voltage across the transformer 194D must be the same as the voltage across the series combination of the conductors 150 and the transformer 194E. The voltage is the same since these branches are electrically in parallel. Expressing the voltage relationship mathematically yields a relationship between the multiplicative factor $T_5$ of transformer 194E and the multiplicative factor $T_4$ of transformer 194D:

$$(T_4)^{-1}I_B R_B = 2T_5 I_B \rho_5 L_5 + (T_5)^{-1} I_B R_B. \tag{36}$$

Dividing each of the terms in Equation (36) by the current $I_B$ leads to $$(T_4)^{-1}R_B = 2T_5 \rho_5 L_5 + (T_5)^{-1} R_B. \tag{37}$$

The same procedure may be applied to the transformer 194C, which is electrically in parallel with the series combination of the conductors 140 and the transformer 194D. In this case, the current flowing through the conductors 140 is given by the sum $T_4 I_B + T_5 I_B$. The resulting expression is $$(T_3)^{-1}R_B = 2(T_4 T_5)\rho_4 L_4 + (T_4)^{-1} R_B. \tag{38}$$

Replacing the last term on the right-hand-side of Equation (38) with the right-hand-side of Equation (37) gives $$(T_3)^{-1} R_B = 2T_4 \rho_4 L_4 + 2T_5(\rho_4 L_4 + \rho_5 L_5) + (T_5)^{-1} R_B, \quad (39)$$

which relates $T_3$ to $T_4$ and $T_5$. The current flowing in the conductors 130 is given by the sum of the current flowing in the conductors 140 and the current flowing through the conductors 70 and 110 connected to the transformer 194C, or $T_3 I_B + T_4 I_B + T_5 I_B$. Similarly, the current flowing through the conductors 120 is found to be $T_2 I_B + T_3 I_B + T_4 I_B + T_5 I_B$. Continuing in the same manner that was used to derive Equation (39) then leads to the relationships $$(T_2)^{-1} R_B = 2T_3 \rho_3 L_3 + 2T_4(\rho_3 L_3 + \rho_4 L_4) + 2T_5(\rho_3 L_3 + \rho_4 L_4 + \rho_5 L_5) + (T_5)^{-1} R_B, \quad (40)$$

and $$(T_1)^{-1} R_B = 2T_2 \rho_2 L_2 + 2T_3(\rho_2 L_2 + \rho_3 L_3) + 2T_4(\rho_2 L_2 + \rho_3 L_3 + \rho_4 L_4) + 2T_5(\rho_2 L_2 + \rho_3 L_3 + \rho_4 L_4 + \rho_5 L_5) + (T_5)^{-1} R_B. \quad (41)$$

At this point, the values of the transformer multiplicative factors required to obtain equal current flow through each light bulb may be calculated using Equations (37), (39), and (41) with $T_5$ chosen arbitrarily. All that remains is to obtain an expression for the voltage required from the power supply 30. The power supply 30 is electrically in parallel with the series combination of the conductors 40 and the transformer 194A, since the electrical connectors 34 have negligible internal resistance that is taken as zero here. The current flowing in the conductors 40 is given by the sum of the current flowing in the conductors 120 and the current flowing through the conductors 70 and 110 connected to the transformer 194A, or $T_1 I_B + T_2 I_B + T_3 I_B + T_4 I_B + T_5 I_B$. Therefore, the value $V_{ST}$ of the supply voltage 30 in a low-voltage light system using transformer compensation elements may be expressed as $$V_{ST} = 2(T_1 + T_2 + T_3 + T_4 + T_5)(P_B/R_B)^{1/2} \rho_1 L_1 + (T_1)^{-1}(P_B R_B)^{1/2}. \quad (42)$$

In Equation (42), $I_B$ has been expressed in terms of the light bulb power $P_B$ and internal resistance $R_B$. As an example, consider the same values as in the case for the resistive compensation elements described previously for the light bulb power rating, light bulb resistance, conductor resistivity, and conductor lengths. The value of $T_5$ is chosen to be 1, which is equivalent to not using a transformer compensation element in the last light bulb 80E in the circuit. Then the values of the remaining transformer multiplicative factors are calculated to be $T_4 = 0.98$, $T_3 = 0.95$, $T_2 = 0.91$, and $T_1 = 0.89$, while the required value of the supply voltage is 14.5 volts.

Inspection of the Equations (37), (39), (40), (41), and (42) allows those skilled in the art to write formulas for the general case of a low-voltage light system with N light bulbs and employing transformer compensation elements:

$$(T_i)^{-1} = (T_5)^{-1} + 2(R_B)^{-1} \sum_{j=i+1}^{N} \sum_{k=i+1}^{j} T_j \rho_k L_k \quad (43)$$

$$V_{ST} = (T_1)^{-1}(P_B R_B)^{1/2} + 2(P_B/R_B)^{1/2} \rho_1 L_1 \sum_{j=1}^{N} T_j, \quad (44)$$

where $i=1$ to $N-1$.

Alternate Embodiment Using Electrical Diode-Based Compensation Elements

Figure 7:
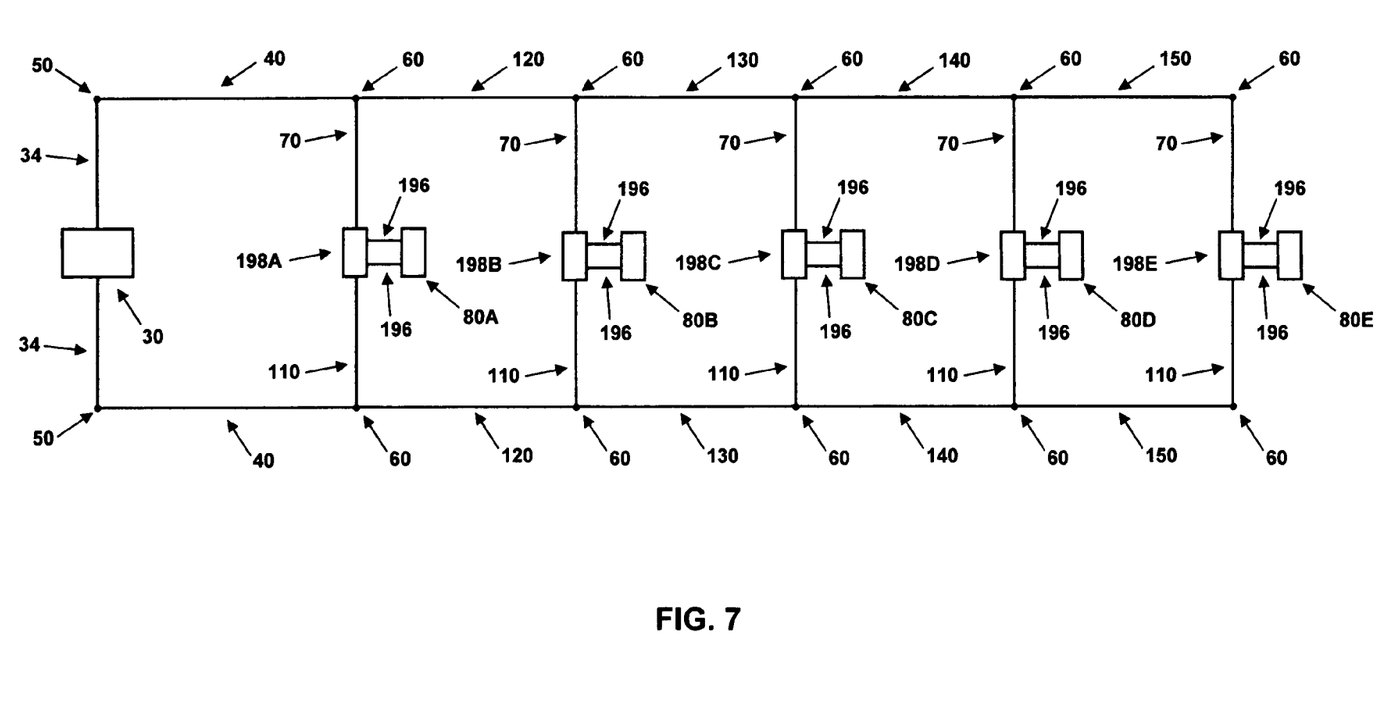
FIG. 7 is an electrical diagram of an example low voltage-light system with 5 light bulbs incorporating electrical diode-based, voltage-limiting, power compensation elements.

A second alternate embodiment of the present invention utilizes electrical diodes to form a voltage-limiting circuit. Such a circuit is placed electrically in parallel with each light bulb, as illustrated in the electrical circuit diagram of FIG. 7. The parallel nature of the interface between the bus lines, power compensation elements, and light bulbs is the same as for the transformer compensation elements in FIG. 6; however, the details of the power equalization are quite different. In FIG. 7, diode-based power compensation elements 198A, 198B, 198C, 198D, and 198E are electrically in parallel with light bulbs 80A, 80B, 80C, 80D, and 80E, respectively. The diode-based power compensation elements limit the voltage applied to the light bulbs so that the voltage is less than, or equal to, a reference voltage level dependent upon the circuit components comprising the diode-based power compensation element.

Figure 8:
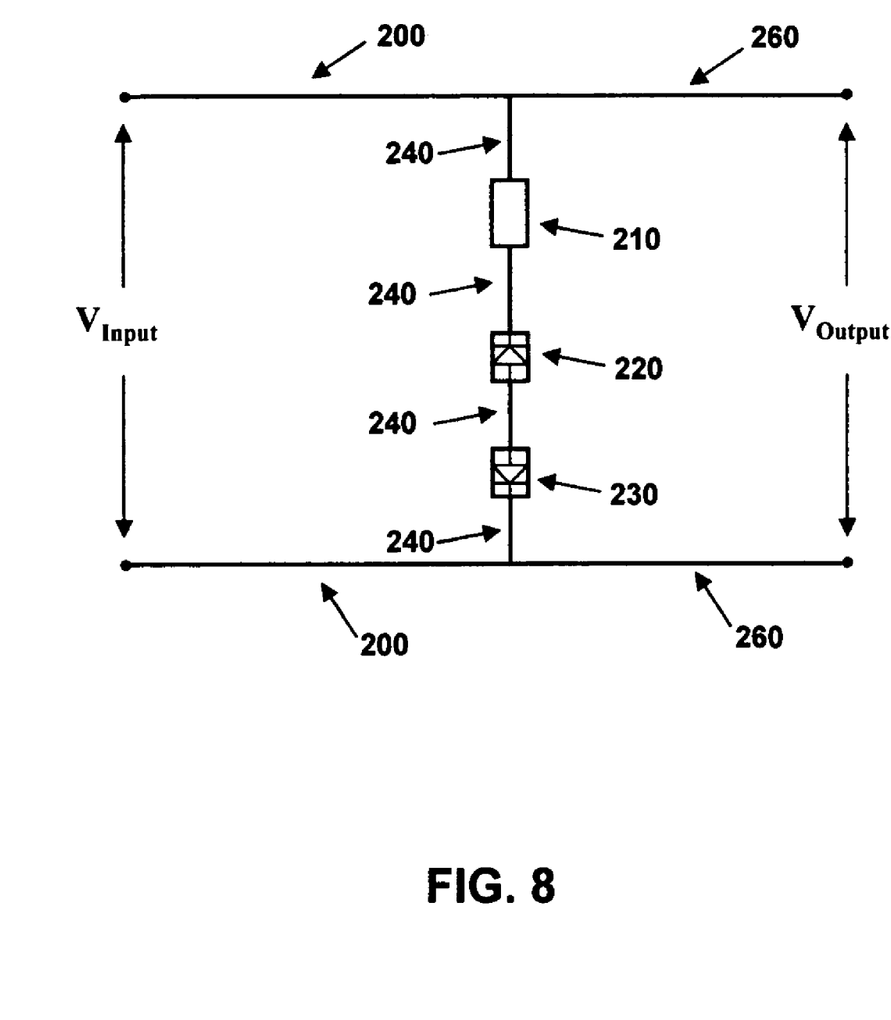
FIG. 8 is an electrical diagram of an example electrical diode-based, voltage-limiting, power compensation element.

Diode-based power compensation elements may be formatted to act in a bipolar manner so that they can be used in either direct-current or alternating current light systems. In an alternating current system, the power compensation circuits would limit both the positive-going and negative-going voltage levels applied to the light bulb so that the absolute value of the applied voltage is less than the absolute value of the reference voltage level. An example diode-based power compensation element using Zener (also known as Avalanche) diodes is shown in FIG. 8, where an input voltage $V_{Input}$ is applied to input terminals 200 of the power compensation element circuit. The input terminals are connected to a series combination of an (optional) capacitor 210, and Zener diodes 220 and 230 via electrical connectors 240. The Zener diode is characterized by a (reverse-bias) breakdown voltage level $V_{BD}$ and a (forward-bias) conduction voltage level $V_{FD}$. One end of the diode is known as the cathode and the other end as the anode. When a positive voltage, greater than or equal to the conduction voltage level is applied to the anode side relative to the cathode side the diode conducts current with little voltage drop (ideally acting like a short circuit). If the applied voltage is less than the conduction level but greater than the breakdown level, then the diode ideally acts like an open circuit. However, when the voltage applied to the anode side is negative (reverse-bias) and greater than, or equal to, the breakdown voltage level in absolute value the Zener diode acts to maintain nearly equal voltage drop across itself for large ranges of current.

In the circuit of FIG. 8, the Zener diodes 220 and 230 are arranged electrically opposing each other with the anode of one diode connected to the anode of the other diode (a cathode-to-cathode connection is also acceptable, since the diodes are still connected in an electrically opposing format). In this way, alternating current voltages would be limited, in both negative and positive portions of the voltage as it varies in time, to an absolute value that is equal to the sum of the breakdown and conduction levels of a single diode and any voltage drop across the optional capacitor 210. The purpose of the optional capacitor is to provide a more gradual transition to the limiting voltage level (takes away sharp edges in the voltage variation with time). Since the circuit works for both positive and negative voltages it also applies to the case of direct-current systems. The output terminals 260 of the diode-based power compensation element would thus provide an output voltage $V_{Output}$ to a light bulb connected to them that is limited in magnitude. If similar diode-circuits are used on all light bulbs in a light system with a sufficiently high power source, then all bulbs would produce substantially similar power levels.

Physical Implementations

Figure 9:
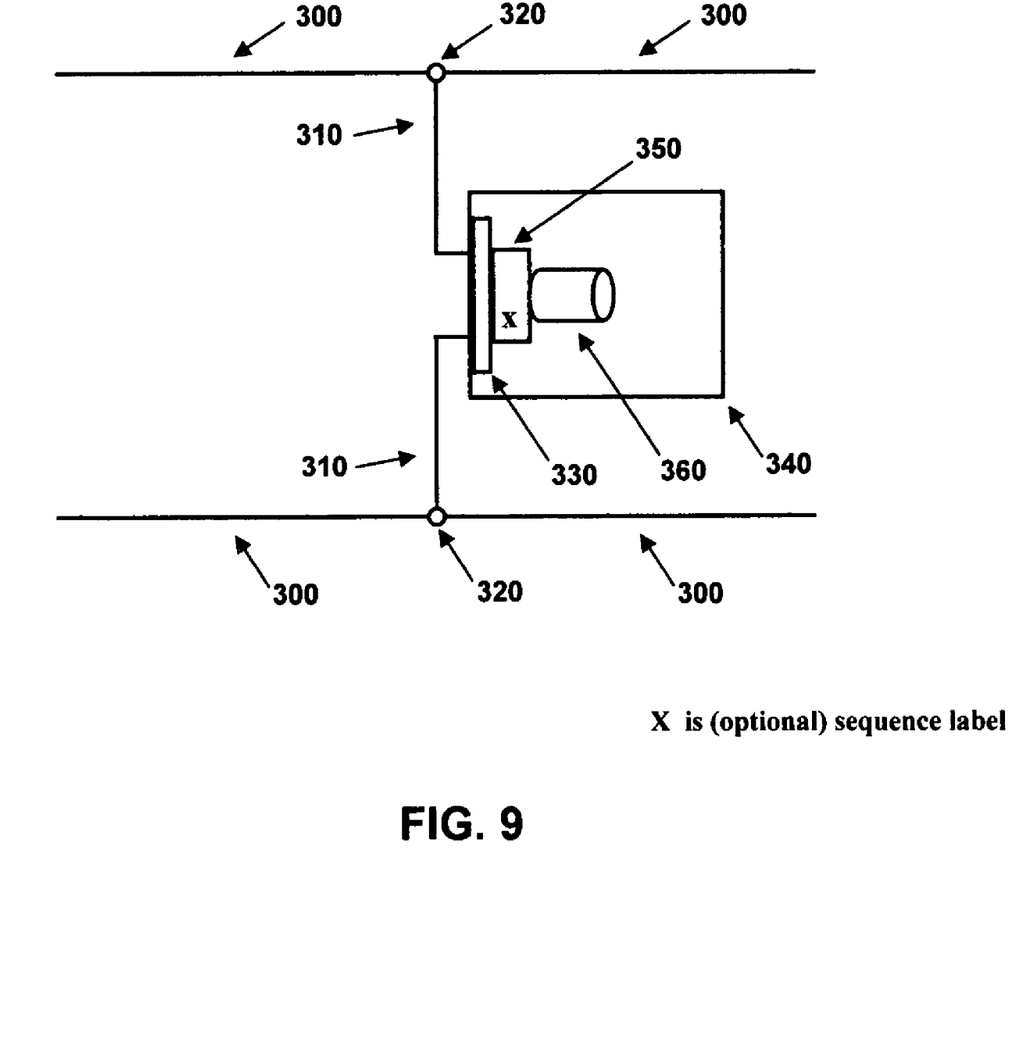
FIG. 9 illustrates an example of a power compensation component pertaining to the present invention that is inserted behind the light bulb in a low-voltage lighting fixture.
Figure 10:
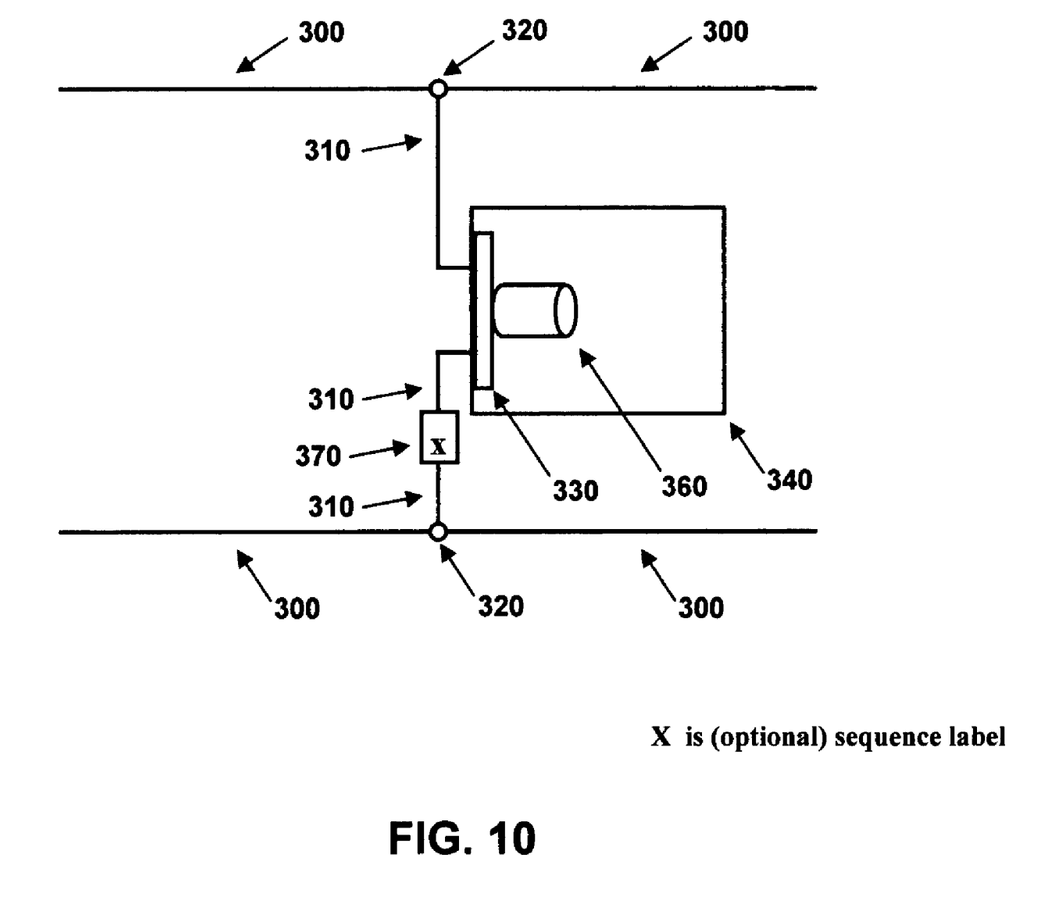
FIG. 10 illustrates an example of a power compensation component pertaining to the present invention that is inserted in-line with the cabling connecting the low-voltage light fixture to the bus lines from the power source.

Examples of physical implementations of the apparatus pertaining to the present invention are presented in FIGS. 9 and 10. In each figure, bus-wire conductor segments 300 are connected to electrical wire segments 310 that are attached to a receptacle 330, which is contained within a light fixture 340. FIG. 9 shows the case where a power compensation element 350 is located between the receptacle 330 and a light bulb 360. Note that a present state-of-the-art system would have the light bulb 360 connected directly to the receptacle 330. Another possible implementation is illustrated in FIG. 10, where a power compensation element 370 is inserted in-line with one of the wire electrical wire segments 310. In contrast to the power compensation element 350 of FIG. 9, the power compensation element 370 of FIG. 10 is more likely to be exposed to moisture and may require a moisture-proof seal. However, the functionality is the same in either case. The power compensation elements in FIGS. 9 and 10 depict optional sequence labels to indicate position information within the lighting circuit.

CONCLUSION, RAMIFICATIONS, AND SCOPE

The example low-voltage light system analyzed here clearly demonstrates the advantage of the present invention over the current state-of-the-art systems in use today. Power levels for the light bulbs may drop by several watts along the circuit in existing systems, but are maintained substantially closer to rated power levels using the present invention.

While the invention has been particularly shown and described with reference to preferred embodiments thereof, it will be understood by those skilled in the art that various changes in form and details may be made therein without departing from the spirit and scope of the invention as defined by the appended claims.

We claim:

1. A system for equalization of voltage across a plurality of individual means for illumination adapted for engagement to wires communicating with an electrical power supply, each of said individual means for illumination sequentially positioned further from said electrical power supply along said wires, wherein said system comprises:
   (a) a plurality of means for equalization of voltage across each of said individual means for illumination,
   (b) each of said respective plurality of said means for equalization of voltage operably interposed between one of said respective said individual means for illumination that is not located furthest from said electrical power supply along said wires and one of said wires communicating with said electrical power supply;
   (c) wherein the value of the combined electrical resistance of said each of said respective plurality of said means for equalization of voltage and said one of said respective said individual means for illumination that is not located furthest from said electrical power supply along said wires, to be substantially equal to the product of:
      (1) the value of the total electrical resistance beyond the location, along said wires, of said one of said respective said individual means for illumination that is not located furthest from said electrical power supply along said wires, up to, and including, the electrical resistance of the individual means for illumination located furthest from said electrical power supply along said wires, and
      (2) a ratio formed by:
         (i) a mathematical summation of the mathematical reciprocal of each value of internal resistance of each of said individual means for illumination located beyond said location, along said wires, up to, and including, said individual means for illumination located furthest from said electrical power supply along said wires divided by
         (ii) the mathematical reciprocal of the value of the internal resistance of said one of said respective said individual means for illumination that is not located furthest from said electrical power supply along said wires;

whereby the voltage across said individual means for illumination sequentially located furthest from said power supply will be substantially equal to the voltage across said individual means for illumination sequentially closer to said electrical power supply along said wires.

2. The system of claim 1 wherein each of said plurality of means for equalization of voltage across each of said individual means for illumination is an electrical resistor.

3. The system of claim 1 with a means for adjustment of the value of said voltage across each of said plurality of individual means for illumination, operably interposed between the means for illumination that is located furthest from said electrical power supply along said wires and one of said wires communicating with said electrical power supply.

4. The system of claim 3 wherein each of said plurality of means for equalization of voltage across each of said individual means for illumination is an electrical resistor.

5. The system of claim 3 wherein said means for adjustment of the value of said voltage across each of said plurality of individual means for illumination is an electrical resistor.

6. The system of claim 4 wherein said means for adjustment of the value of said voltage across each of said plurality of individual means for illumination is an electrical resistor.

7. A system for equalization of voltage across a plurality of individual means for illumination adapted for engagement to wires communicating with an electrical power supply, each of said individual means for illumination sequentially positioned further from said electrical power supply along said wires and connected electrically in parallel with said electrical power supply, wherein said system comprises:
   (a) a plurality of means for equalization of voltage across each of said individual means for illumination,
   (b) each of said respective plurality of said means for equalization of voltage operably interposed between one of said respective said individual means for illumination that is not located furthest from said electrical power supply along said wires and said wires communicating with said electrical power supply; wherein the voltage across said one of said individual means for illumination is substantially equal to the voltage across the individual means for illumination located furthest from said electrical power supply along said wires;

whereby the voltage across said individual means for illumination sequentially located furthest from said power supply will be substantially equal to the voltage across said individual means for illumination sequentially closer to said electrical power supply along said wires.

8. The system of claim 7 with a means for adjustment of the value of said voltage across each of said plurality of individual means for illumination, operably interposed between the means for illumination that is located furthest from said electrical power supply along said wires and said wires communicating with said electrical power supply.

9. A system for equalization of voltage across a plurality of individual means for illumination adapted for engagement to wires communicating with an electrical power supply, each of said individual means for illumination sequentially positioned further from said electrical power supply along said wires and connected electrically in parallel with said electrical power supply, wherein said system comprises:
 (a) a plurality of means for equalization of voltage across each of said individual means for illumination,
 (b) each of said respective plurality of said means for equalization of voltage is an electrical transformer that is operably interposed between one of said respective said individual means for illumination that is not located furthest from said electrical power supply along said wires and said wires communicating with said electrical power supply; wherein the voltage across said one of said individual means for illumination is substantially equal to the voltage across the individual means for illumination located furthest from said electrical power supply along said wires;
whereby the voltage across said individual means for illumination sequentially located furthest from said power supply will be substantially equal to the voltage across said individual means for illumination sequentially closer to said electrical power supply along said wires.

10. The system of claim 9 with a means for adjustment of the value of said voltage across each of said plurality of individual means for illumination, operably interposed between the means for illumination that is located furthest from said electrical power supply along said wires and said wires communicating with said electrical power supply.

11. The system of claim 10 wherein said means for adjustment of the value of said voltage across each of said plurality of individual means for illumination is an electrical transformer.

\* \* \* \* \*